UNITED STATES PATENT OFFICE 2,585,103

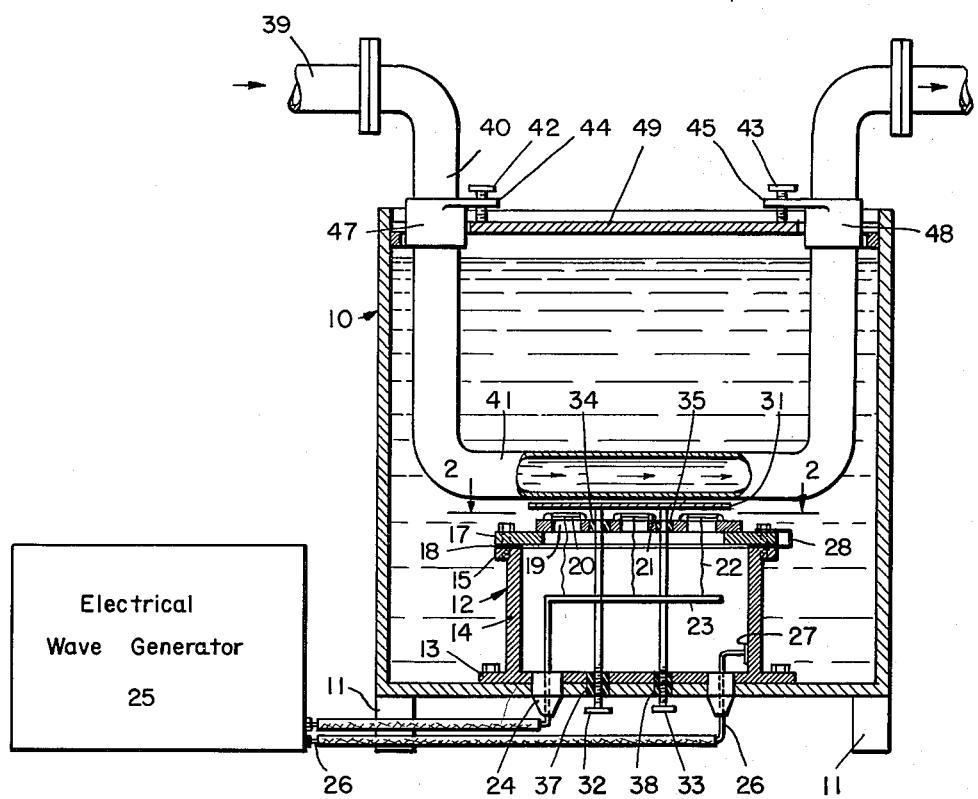
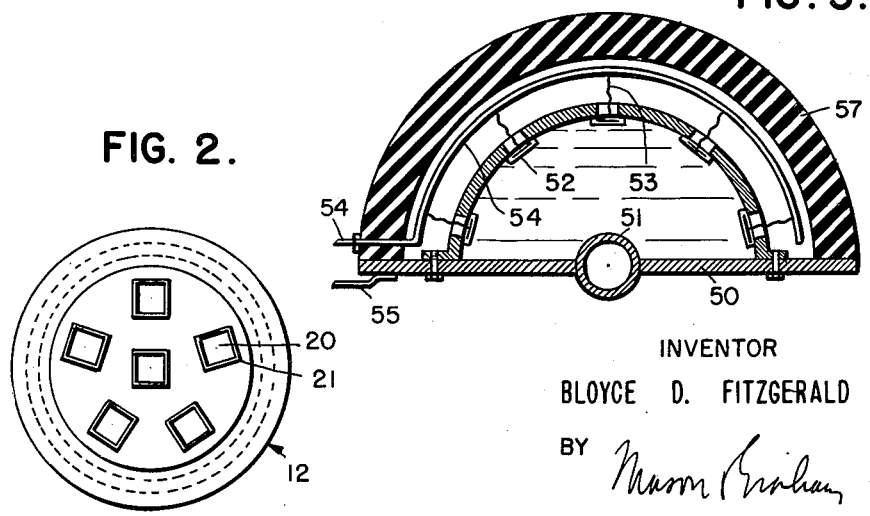
INVENTOR
BLOYCE D. FITZGERALD

APPARATUS FOR ULTRASONIC TREATMENT OF LIQUIDS

Bloyce D. Fitzgerald, Whittier, Calif., assignor to Otis A. Brown, Whittier, Calif.

Application March 8, 1948, Serial No. 13,680

5 Claims. (Cl. 99—250)

The present invention relates to the treating of liquids by ultrasonic vibrations, and to a mechanism and method for generating powerful high frequency or ultrasonic oscillation in liquids, such as are required for preserving food juices by destroying mold spores and bacteria therein by ultrasonic treatment.

Substantial amounts of work in ultrasonics have been conducted over recent years, and it has been found possible to produce ultrasonic oscillations in a liquid by various means, the most effective of which comprises employing a piezo-electric crystal immersed in or covered by a liquid and energized by a suitable oscillating electric current. Such oscillations as have been produced in liquids, in this manner, have been of limited power and amplitude. This has been due to the necessary limitations in the size of such crystals and the power to which they may be subjected. For example, if it is attempted to employ a quartz crystal of greater than one and one-half centimeters effective diameter, and thin enough to produce an effective wave, the crystal will break very easily under even moderate current impulses. Also, in attempts which have been made to employ a multiple crystal unit having a number of small diameter crystals, each of which is adapted to withstand subjection to a substantial current, the ultrasonic oscillation impulses transmitted to a liquid have been found not to be in proportion to the total effective transmission area of the several individual crystals. This is thought to have been caused by an interference of the generated impulses with each other in the liquid.

I have discovered, however, that by arranging a plurality of such smaller crystals in a mosaic pattern with all the crystals carefully matched as to oscillation frequency, and spaced with their centers separated by a distance equal to an odd multiple of their common wave length, and all located in a common plane, that their effect is cumulative. Furthermore, the usual apparent interference produced by the use of a multiplicity of crystals is not present. The plane in which the crystals are located may be flat, or arcuately curved, thereby to focus the oscillations produced by the crystals. The center-to-center spacing of the crystals must be accurate within the limit of minimum practical tolerance between wave length variation of the crystals themselves.

It is a fact well known to the citrus industry that citrus fruits while on the trees have very little if any mold or bacteria on the skins thereof. However, almost as soon as the fruit is picked, mold spores begin to develop on the skin of the fruit. This mold develops at a relatively rapid rate thereafter.

Usually a period of two to three days elapses between the time when citrus fruit is picked and the time it is processed, as in the making of orange and grapefruit juices, or in packing for storage or shipment.

When citrus fruit having mold or bacteria on its skin is cut, as is customary in extracting the juice, some of the mold spores or bacteria on the skin are carried into the interior of the fruit by the cutting knife, and thereafter are present in the juice. Unless such mold spores and bacteria are destroyed, as for example, by heat or chemical action, or are kept from reproducing by maintaining the juice under refrigeration, they will multiply rapidly and cause the juice to spoil in a relatively short period of time.

I have discovered that by subjecting fruit juices, for example orange juice, to ultrasonic impulses having a wave length of approximately one-half the length of mold spores or bacteria therein, such organisms will be destroyed thereby. Furthermore, such ultrasonic treatment does not adversely affect the taste or other qualities of the fruit juices thus treated. In fact, it has an additional beneficial effect on the juice so treated in that it breaks down and homogenizes the oil particles in the juice and disperses them throughout the juice. This action prevents the oil from separating out and forming the usual oil ring in containers in which the juice is kept. It also has the effect of homogenizing the pectin in the juice and prevents it from settling out.

An object of the present invention is to treat fruit juices by ultrasonic oscillations for the destruction of mold and bacteria therein.

Another object is to project ultrasonic oscillations through a liquid to destroy mold and bacteria present therein.

Another object is to project a plurality of sets of substantially simultaneously tuned ultrasonic impulses toward and through a body of liquid into a separately contained quantity of fruit juices.

Another object is to induce tuned ultrasonic impulses through a mass of a flowing liquid food product by subjecting a plurality of similar, crystal, ultrasonic impulse generators to similar exciting currents, the crystal generators being disposed in a common plane and being spaced on center-to-center distances equal to an odd multiple of their wave length.

Another object is to destroy mold and bacteria organisms having a known dimension in food juices by causing a stream of food juice in a closed passage to flow through a quantity of liquid while subjecting the latter liquid to ultrasonic impulses having a wave length substantially equal to one-half the length of organisms to be destroyed.

Another object is to destroy bacterial growth and mold spores of known dimension in a liquid by subjecting them to ultrasonic waves of a length proportionate to such dimension.

Another object is to make an improved ultrasonic liquid treating mechanism by use of a special mosaic of matched and arranged piezo-electric crystals.

These and other objects of the invention will be more fully set forth in the following description and the accompanying drawings. In the drawings:

Fig. 1 is a vertical, somewhat diagrammatic sectional view, through an apparatus embodying the present invention, a portion of a juice conducting pipe being broken away;

Fig. 2 is a fragmentary sectional view taken in the plane of the line 2—2 of Fig. 1; and Fig. 3 is an enlarged fragmentary sectional view through a modified form of the device.

Referring to the drawings in detail, an outer tank 10 may be of any suitable type, and preferably is of welded steel plate construction. The tank is supported on legs 11 and has a smaller inner tank 12 bolted to the base of the outer tank. A suitable sealing medium, such as zinc oxide, may be applied between the contacting faces of the bottoms of the inner and outer tanks to insure a liquid tight seal.

The inner tank, as illustrated, has a bottom plate 13 to which side walls 14 are secured as by welding. A flange 15 is welded around the upper rim of the inner tank and a top plate 17 is bolted thereto. A gasket 18 or other suitable sealing medium is employed between the flange 15 and the top plate 17 to provide a liquid tight seal at this juncture.

A plurality of crystal mounting openings 19 are provided in the top plate 17 of the inner tank and over each of these openings a piezo-electric crystal 20 is mounted. These piezo-electric crystals, are illustrated as rectangular, and may be of quartz. They all are of the same thickness and size, so as to generate impulses having a common wave length, and are mounted in usual type mounting rims 21 to position all of the crystals accurately in the same plane. The crystals are accurately spaced on equal center-to-center distances from each other, this distance between centers being an odd multiple of the common wave length generated by the crystals. Each of the crystals preferably is coated with a silver or other suitable electrically conductive coating, as by plating in a known manner, and a fine flexible conducting wire 22 is connected from the center of each crystal to a common bus bar 23.

The bus bar 23 passes through an insulative bushing 24 and is connected to one side of an electric wave generator 25 of a suitable nature. The other side of the wave generator is grounded at 27 through a conductor 26 to a side of the inner tank. A conductor such as a metal strip 28 connects to the wall of the tank of the top plate 17 thereof, forming a ground connection for the crystals 20 which in turn have the edges of the silvered surfaces thereof in electrical contact through their mounting rims 21 with the top plate 17.

An acoustic matching plate 31, which may be of thin steel or other suitable material, is adjustably mounted on screws 32 and 33, which are threaded through insulating bushings 34 and 35 in the top plate 17 and also through insulated bushings 37 and 38 in the bottom plates of both the tanks 10 and 12.

A liquid carrying tube 39 has a U-shaped portion 40, the transverse lower portion 41 of which passes over the acoustic matching plate 31, being spaced therefrom a distance which is adjustable as by means of screws 42 and 43 which are mounted in brackets 44 and 45 secured to collars 47 and 48 fastened to the vertical runs of the U-shaped portion 40 of the liquid carrying tube. These screws rest on a supporting plate 49 mounted transversely of the larger tank 10. The larger tank 10 has a quantity of suitable electrically insulating oil therein, and the interior of the smaller tank 12 remains dry. The oil in the larger tank is of a depth to cover the lower portion of the U-shaped tube 40.

Impulses from the electric wave generator at a frequency to match the thickness of the piezo-electric crystals is transmitted through the conductors 22 to each of the crystals so as to cause them to oscillate in unison. The common wave length of the ultrasonic oscillations produced should be approximately one-half of the diameter of the mold spores and bacteria in the liquid to be treated and which it is desired to destroy.

A supply of potable juice, for example a citrus fruit juice, is caused to flow through the tube 39. Ultrasonic impulses from the crystals 20 are transmitted to the oil in the tank 10 and, under control of the acoustic matching plate 31, through the wall of the U-shaped tube 40 and through the fruit juice in the lower or immersed portion thereof. Adjustment of the acoustic matching plate and of the U-shaped tube 40 may be made by means of the screws 32, 33, 42 and 43 to provide for the greatest transmission of ultrasonic waves through the fruit juice in the U-shaped tube 40. The speed of flow of the juice through the tube 39 is controlled to insure a desired destructive effect on the mold spores and bacteria present in the juice being extracted. Inspection of the juice after it has passed through the ultrasonic field to determine the bacteria count, as well as preliminary inspection of the juice to determine the bacteria count before treatment, permits controlling the destructive effect in the treated juice to very accurate degrees. The slower the juice flows through the tube, of course, the longer it will be subjected to the ultrasonic impulses and the greater the destruction of bacteria which will be accomplished.

In the modified arrangement shown in Fig. 3, a semi-cylindrical smaller tank 50 has a juice conducting tube 51 mounted with its axis coincident with the axis of curvature of the wall of the tank 50. A plurality of piezo-electric crystals 52 are mounted with their inner surfaces tangential to a curved surface such as the curve of the tank wall 50. The centers of the crystals are all at equal distances from the axis of the juice conveying tube 51. Each crystal 52 is connected by a thin flexible conductor 53 to a conductor 54 which is connected as in the embodiment shown in Fig. 1 to one side of an electrical wave generator. The other side of the generator is grounded by a conductor 55 to a wall of the tank 50.

A flexible housing 57, which may be of neoprene, encloses a space outwardly beyond the semi-cylindrical wall of the outer tank 50. The space between the neoprene housing 57 and wall of the tank 50 is filled with a suitable insulating oil. The interior of the tank 50 also is filled with oil in this embodiment of Fig. 3.

The operation of the modified arrangement shown in Fig. 3 is similar in general to that shown in Figs. 1 and 2 with the exception that the mounting of the crystals tangentially to a curved plane has the effect of focusing the ultrasonic waves produced toward and through the pipe 51, and the liquid therein to be subjected to the ultrasonic oscillations.

While I have illustrated and described a preferred embodiment of my invention, it is to be understood that the arrangement is capable of some modification without departing from the spirit of the invention. It is desired, therefore, not to limit the invention except as set forth in the following claims.

I claim:

1. An apparatus for generating ultrasonic impulses in a liquid, comprising a tank, a quantity of electrically non-conductive liquid in said tank, a mosaic formed of a plurality of matched, coplanar piezo-electric crystals mounted on center-to-center spacing equal to an odd multiple of their common wave length, electrical generating means adapted to produce a current to produce an oscillation of said crystals, and conductor means from said generating means to said crystals, an element to be treated immersed in said liquid and spaced a predetermined distance from said mosaic, and an oscillation matching plate imposed between said mosaic and the element to be treated, said matching plate being mounted for adjustment toward and away from said mosaic.

2. The apparatus set forth in claim 1, the element to be treated comprising a tubular passage having a portion thereof with its axis in a plane lying parallel to, and spaced a predetermined distance from, the common plane of said mosaic crystals.

3. An apparatus for generating ultrasonic impulses in a liquid for the destruction of mold spores and bacteria therein, said apparatus comprising an outer tank, an inner tank mounted therein, a quantity of electrically non-conductive liquid in the outer tank to cover a wall of the inner tank, the inner tank being air filled, a plurality of piezo-electric crystals mounted in a wall of the inner tank to have a side thereof exposed to the non-conductive liquid, the crystals being co-planar and spaced on center-to-center distances comprising an odd multiple of their common wave length, electrical means for generating an oscillating current of proper frequency to oscillate said crystals, electrical conducting means mounted to conduct said current to said crystals, a tube having a portion thereof immersed in said liquid and spaced a predetermined distance from the common plane of said mosaic crystals, said tube being adapted to pass a stream of liquid therethrough, and an oscillation matching plate mounted between the tube and the mosaic in a plane parallel to the common plane of the crystals of said mosaic, said plate being adjustable toward and away from said mosaic.

4. An apparatus for generating ultrasonic impulses in a stream of liquid flowing through a tubular passage comprising a straight length of tubing, means for flowing a supply of liquid through said tubing, a tank having a semi-cylindrical wall mounted with the axis of curvature of its semi-cylindrical wall within said tubing, a plurality of matched piezo-electric crystals mounted tangentially to said semi-cylindrical wall at equal distances from the axis of curvature of said wall, the space between the semi-cylindrical wall and the tubing being filled with an electrically insulative liquid.

5. The apparatus set forth in claim 4, the outer side of the semi-cylindrical wall having a wall of electrically insulative resilient material surrounding it and spaced outwardly therefrom.

BLOYCE D. FITZGERALD.

REFERENCES CITED

The following references are of record in the file of this patent:

UNITED STATES PATENTS

| Number | Name | Date |
| --- | --- | --- |
| 1,734,975 | Loomis et al. | Nov. 12, 1929 |
| 1,738,565 | Claypoole | Dec. 10, 1929 |
| 1,939,302 | Heany | Dec. 12, 1933 |
| 2,086,891 | Bachmann | July 13, 1937 |
| 2,163,650 | Weaver | June 27, 1939 |
| 2,170,178 | Williams | Aug. 22, 1939 |
| 2,407,462 | Whiteley | Sept. 10, 1946 |
| 2,436,377 | Briggs et al. | Feb. 24, 1948 |
| 2,438,936 | Mason | Apr. 6, 1948 |
| 2,448,372 | Horsley | Aug. 31, 1948 |
| 2,450,412 | Benioff | Oct. 5, 1948 |
| 2,452,068 | Peterson | Oct. 26, 1948 |
| 2,452,570 | Hubbard | Nov. 2, 1948 |

OTHER REFERENCES

"Journal of Bacteriology," vol. 17, 1929, pages 373 to 376, article entitled "The Destruction of Luminous Bacteria by High Frequency Sound Waves" by Harvey and Loomis.

"Journal of Bacteriology," vol. 32, Nov. 1936, pp. 361 to 373, article entitled "Sonic Energy As a Lethal Agent for Yeast and Bacteria" by Beckwith and Weaver.

"Application of Supersonics" by J. D. Goodall, Radio News, Feb. 1944.